F. THOMAS.
COFFEE-ROASTER.
No. 169,498. Patented Nov. 2, 1875.
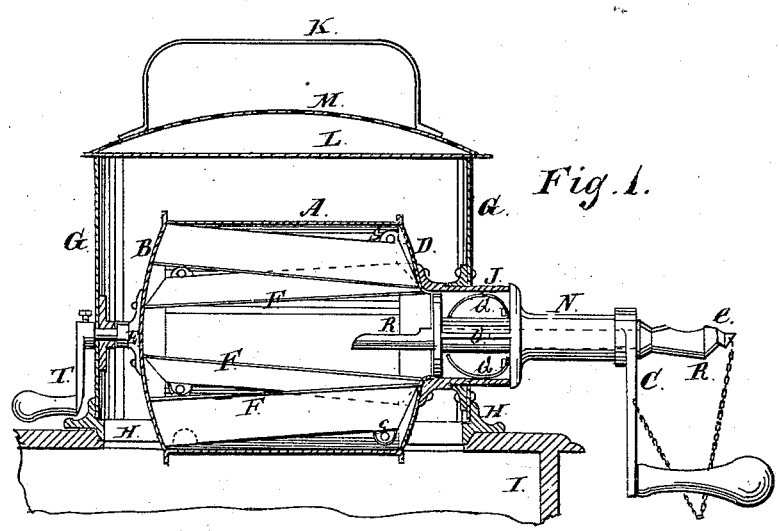
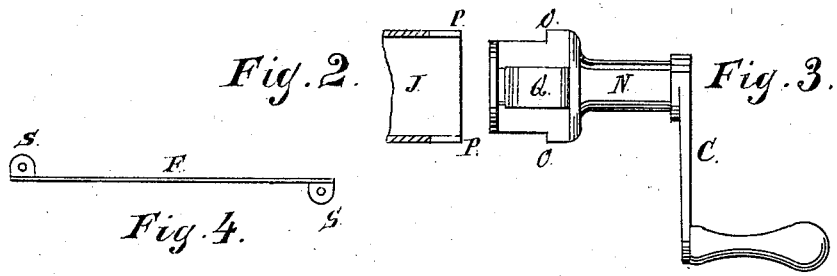
Witnesses:
Heinrich F. Bruns.
John G. Evenelen
Inventor:
Frederick Thomas
by L. L. Coburn
Atty.

UNITED STATES PATENT OFFICE.

FREDERICK THOMAS, OF BLOOMINGTON, ILLINOIS.

IMPROVEMENT IN COFFEE-ROASTERS.

Specification forming part of Letters Patent No. 169,498, dated November 2, 1875; application filed July 12, 1875.

*To all whom it may concern:*

Be it known that I, FREDERICK THOMAS, of Bloomington, in the county of McLean and State of Illinois, have invented an Improvement in Coffee-Roasters, of which the following is a specification, reference being had to the accompanying drawings, which form a part hereof.

My invention relates to that class of coffee-roasters which receives its heat from an ordinary stove or range; and it consists of the special construction and combination of its various parts, as hereinafter fully described.

In the accompanying drawings, Figure 1 represents a vertical section of the coffee-roaster with the part of a stove. Fig. 2 shows a detached view of one hollow journal, J; Fig. 3, a view of the crank C, with the part which engages in the journal J. Fig. 4 is an edge view of one of the flanges F detached.

A represents a metallic cylinder, provided with heads B and D. The head B has attached to it a solid journal, E, and the head D a hollow journal, J. These journals have bearings in a metallic vessel, G. This inclosing vessel or chamber G has a flanged ring or frame, H, constituting its base or bottom, which is made to fit into an ordinary stove-hole. I preferably make the part G of sheet metal, and the ring or frame H of cast-iron, and rivet them together. I is a section of a part of the stove, and Fig. 1 represents the coffee-roaster as applied in position on the stove for use. K is a handle, by which the roaster is carried and handled. I make a double top for the chamber G, the inner one, L, being tight, and the top one, M, being perforated. This admits of circulation of air between them, and protects the handle K from becoming too highly heated. This is quite necessary, because the fire passes directly into the chamber G when the coffee is being roasted. C is a crank for turning the cylinder A, in which the coffee is roasted. It has a hollow shaft, N. This hollow shaft is provided with notched flanges O, which fit into slots P in the hollow journal J. It is also provided with springs Q, which press upon the interior of the hollow journal J, and hold the hollow shaft in the journal in any ordinary usage of the roaster, but admit of its being pulled out of the journal when it is desired to either fill or empty the roaster. The notched flanges O, fitting into the slots P, prevent the hollow shaft N from turning in the hollow journal J. R is a coffee-tester, which serves as a stopple in the hollow shaft N, and has upon its inner end a receiving-cup, which is sufficiently large to hold a few kernels of coffee. By removing this tester R a few kernels of the coffee are taken from the roaster for examination. There is a depression or mark, $e$, on one side of the handle of this tester, which indicates which side up the cup on the opposite end of the tester is. F are flanges riveted diagonally across the interior of the cylinder A; but they are riveted alternately diagonally to each other. These flanges or ledges, by being riveted in this manner, not only carry the coffee up as the roasting-cylinder A is revolved, but also carry it from end to end of the cylinder. One flange, as it carries up the coffee, is inclined, so that the coffee slides toward one end of the cylinder, while the next flange to it is so inclined that the coffee slides upon it toward the opposite end of the cylinder. These flanges are made by cutting a piece from one side, leaving projections, which are turned over at right angles, forming ears S' S, by which they are riveted to the cylinder A. T is a crank, which is attached to the solid journal E of the roasting-cylinder A.

When the coffee is roasted sufficiently, the hollow shaft N is pulled from the journal J. The roaster is then removed from the stove by its handle K, and the coffee poured out through the hollow journal J.

In order to completely discharge the roasting-cylinder it is revolved by the crank T.

I claim—

1. The combination of the hollow journal J and the crank-shaft N, provided with springs Q and flanges O.

2. The combination of the hollow crank-shaft N, and tester R, and hollow journal J.

3. The combination of the roasting-cylinder A and the flanges F, attached diagonally to the cylinder and to each other, thus forming a regular zigzag around the inner surface of the former, substantially as and for the purpose specified.

FREDERICK THOMAS.

Witnesses:
 HEINRICH F. BRUNS,
 JOHN G. EVENDEN.